United States Patent
Syamoto et al.

(10) Patent No.: US 6,547,696 B2
(45) Date of Patent: Apr. 15, 2003

(54) SHIFT LEVER DEVICE

(75) Inventors: Noriyasu Syamoto, Aichi (JP); Norihito Saito, Aichi (JP); Hirokazu Shamoto, Aichi (JP); Katsushi Nagashima, Aichi (JP); Yutaka Suzuki, Aichi (JP); Masashi Sakurai, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/867,059

(22) Filed: May 29, 2001

(65) Prior Publication Data

US 2002/0002849 A1 Jan. 10, 2002

(30) Foreign Application Priority Data

May 31, 2000 (JP) .................... 2000-161706

(51) Int. Cl.[7] .............................................. F16H 59/08
(52) U.S. Cl. .......................................... 477/99; 70/248
(58) Field of Search ............................. 477/99; 70/248

(56) References Cited

U.S. PATENT DOCUMENTS

| | | | | | |
|---|---|---|---|---|---|
| 1,743,225 | A | * | 1/1930 | Martel | 70/248 |
| 1,826,649 | A | * | 10/1931 | Briggs | 70/248 |
| 2,241,677 | A | * | 5/1941 | Sheldrick | 477/99 |
| 2,438,455 | A | * | 3/1948 | Roeder et al. | 477/99 |
| 3,590,613 | A | * | 7/1971 | Kimberlin et al. | 70/248 |
| 3,947,060 | A | | 3/1976 | Zimmer et al. | |
| 4,817,405 | A | * | 4/1989 | Gentry | 70/247 |
| 4,821,605 | A | | 4/1989 | Dzioba | |
| 5,065,604 | A | * | 11/1991 | Pattock | 70/239 |
| 5,078,242 | A | * | 1/1992 | Ratke et al. | 477/99 |
| 5,218,847 | A | | 6/1993 | Dieden et al. | |
| 5,299,470 | A | * | 4/1994 | Snell et al. | 477/99 |
| 5,309,744 | A | * | 5/1994 | Kito et al. | 70/248 |
| 5,406,860 | A | | 4/1995 | Easton et al. | |
| 5,480,198 | A | | 1/1996 | Wydler et al. | |
| 5,656,867 | A | * | 8/1997 | Kokubu | 307/10.5 |
| 5,662,001 | A | | 9/1997 | Smale | |
| 5,682,777 | A | | 11/1997 | Specht | |
| 5,801,614 | A | * | 9/1998 | Kokubu | 340/425.5 |
| 5,902,209 | A | * | 5/1999 | Moody | 477/99 |
| 5,913,909 | A | * | 6/1999 | Schwab | 70/248 |
| 5,954,616 | A | * | 9/1999 | Snell et al. | 477/99 |
| 5,977,655 | A | * | 11/1999 | Anzai | 307/10.3 |
| 6,006,887 | A | * | 12/1999 | Tazai | 477/99 |
| 6,196,078 | B1 | * | 3/2001 | DeJonge et al. | 74/473.12 |
| 6,339,325 | B1 | | 1/2002 | Oda et al. | |
| 6,354,120 | B1 | * | 3/2002 | Tan et al. | 70/252 |
| 6,415,677 | B1 | | 7/2002 | Skogward | |

FOREIGN PATENT DOCUMENTS

| | | |
|---|---|---|
| AU | 723 285 | 8/2000 |
| EP | 0 936 385 A2 | 8/1999 |
| EP | 0 990 821 A1 | 4/2000 |
| EP | 1 069 011 A2 | 1/2001 |
| FR | 2 737 160 A1 | 1/1997 |
| FR | 2 741 311 A1 | 5/1997 |
| GB | 2 359 118 A | 8/2001 |
| JP | 10-059132 | 3/1998 |

* cited by examiner

*Primary Examiner*—Sherry Estremsky
(74) *Attorney, Agent, or Firm*—Crompton, Seager & Tufte, LLC

(57) ABSTRACT

A shift device including a key cylinder and a shift lever is disclosed. The key cylinder is located adjacent to the shift lever. The key cylinder receives a key corresponding to the key cylinder. When the key is located at the ON position, the key cylinder generates an engine driving signal to an engine ECU. A stopping mechanism is located between the key cylinder and the shift lever for selectively stopping the movement of the shift lever depending on the selected key position.

15 Claims, 8 Drawing Sheets

SHIFT LEVER DEVICE

BACKGROUND OF THE INVENTION

The present invention relates to shift lever devices, and, more particularly, to shift lever devices that include ignition key cylinders.

A typical shift lever device (hereinafter referred to as a "shift device") is located at a position spaced from an ignition key cylinder, which is operated when starting the engine. The shift device is connected to the key cylinder through a link mechanism provided with a link cable. If an ignition key corresponding to the key cylinder is inserted in the key cylinder when the shift lever is located at the parking position ("P" position), the link mechanism permits the key to rotate. In other words, even though the key is inserted in the key cylinder, the link mechanism does not permit the key to rotate in the key cylinder as long as the shift lever is located at positions other than the "P" position.

If the shift device is used in a conventional shift-by-wire type automatic transmission mechanism, the shift device electrically controls an actuator that actuates a manual shift valve to shift the gear. A control procedure is performed in accordance with a shift signal that corresponds to the position at which the shift lever is located. The shift device of the shift-by-wire type automatic transmission mechanism is connected to the ignition key cylinder through a power cable, instead of the link cable. The ignition key cylinder is selectively locked depending on the position at which the shift lever is located. More specifically, a locking solenoid is connected to the ignition key cylinder. If the shift lever is located at the "P" position, the locking cylinder is inactivated to unlock the key cylinder. In this state, the key cylinder is permitted to operate. In contrast, if the shift lever is located at positions other than the "P" position, the locking solenoid is activated to lock the ignition key cylinder. In this state, the key cylinder is not permitted to operate.

However, to connect the ignition key cylinder to the shift lever, the shift device must include a connector in addition to the link cable or power cable. This structure increases the manufacturing cost of the shift device.

Particularly, if the shift device is used in a shift-by-wire type automatic transmission mechanism, a shift locking control procedure is performed in accordance with ID information registered in the ignition key. The control procedure thus complicates the electric circuit for executing the procedure.

BRIEF SUMMARY OF THE INVENTION

Accordingly, it is an objective of the present invention to provide a shift lever device with a simple structure. It is another objective of the present invention to provide a shift lever device that simplifies a shift locking control procedure.

To achieve the above objectives, the first aspect of the present invention provides a shift device having a shift lever, which is manually operated in at least two directions. The shift device includes a rotary switch, which is located adjacent to the shift lever and is switched between a plurality of rotational positions and a stopping mechanism located between the rotary switch and the shift lever. The rotary switch generates an engine driving signal depending on a selected rotational position. The stopping mechanism selectively stops the movement of the shift lever depending on the selected rotational position.

The second aspect of the present invention provides a shift device having a shift lever, which is manually operated in at least two directions. The shift device includes a rotary switch, which is located adjacent to the shift lever and switched between a plurality of rotational positions, a stopping mechanism located between the rotary switch and the shift lever, and a prohibiting member formed in the shift lever. The rotary switch generates an engine driving signal depending on a selected rotational position. The stopping mechanism is moved selectively to a stopping position, at which the stopping mechanism stops movement of the shift lever and a permitting position, at which the stopping mechanism permits the movement of the shift lever, depending on the selected rotational position. The prohibiting member prevents the stopping mechanism from being moved to the stopping position when the stopping member is located at the permitting position.

The third aspect of the present invention provides a shift device having a shift lever, which is connected to a vehicle transmission device and manually operated in at least two directions. The shift device includes a base, a shift lever, which is supported by the base to pivot selectively in X and Y directions, a key cylinder, which is located on the base at a position adjacent to the shift lever and is rotated to a plurality of key positions including an ON position and an OFF position using a key corresponding to the key cylinder, and a stopping mechanism located between the key cylinder and the shift lever. The stopping mechanism stops the movement of the shift lever in the first and second directions when the key cylinder is located at the OFF position but permitting the movement of the shift lever in the first and second directions when the key cylinder is located at the ON position.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
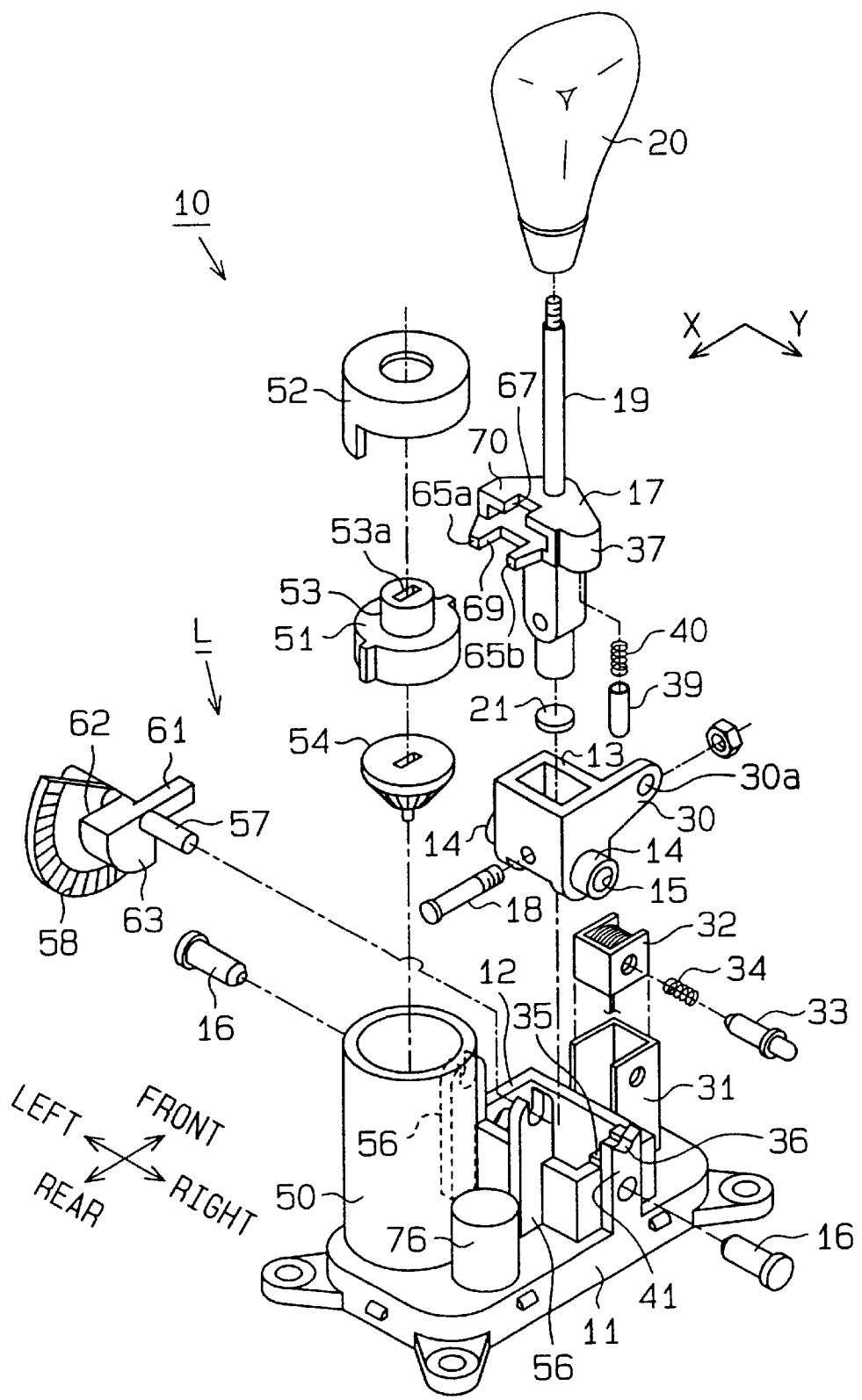
FIG. 1 is an exploded perspective view showing a shift device of an embodiment according to the present invention.

A shift device 10 of an embodiment according to the present invention will now be described with reference to FIGS. 1 to 13. In the drawings, an X axis extends perpendicular to a Y axis. Hereinafter, the directions indicated by the arrows representing the X axis and the Y axis will be referred to as X direction and Y direction, respectively.

Figure 3:
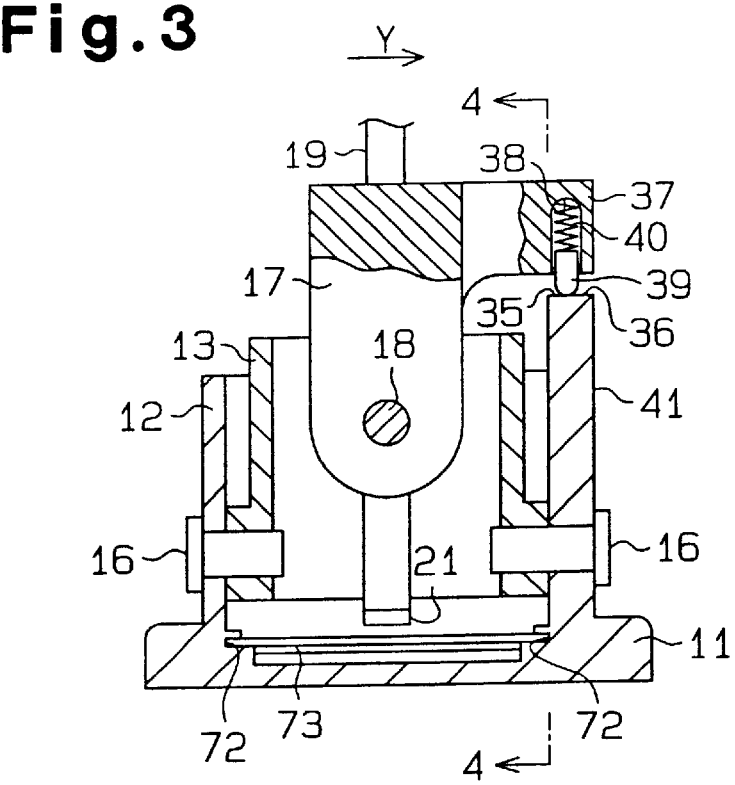
FIG. 3 is a cross-sectional view showing a portion near the base of the shift lever of the shift device shown in FIG. 1.

The shift device 10, which is used in a shift-by-wire type automatic transmission mechanism, is secured to the floor of a vehicle. As shown in FIGS. 1 and 3, the shift device 10 includes a base 10. A square support frame 12 projects upward from the base 10, as viewed in the drawings. A hollow, square retainer 13 is received in the space defined by the support frame 12. The retainer 13 has a pair of coaxial bosses 14 that project along the Y axis. Each boss 14 has a boss opening 15. A pair of support pins 16 are passed through holes formed in associated walls of the support frame 12 and are received in the associated boss holes 15. The support frame 12 supports the retainer 13 such that the retainer 13 pivots around the support pins 16.

A base of a lever body 17 is accommodated in the retainer 13. A support bolt 18 extends through the retainer 13 and the lever body 17. A nut is fastened to the support bolt 18. The support bolt 18 supports the lever body 17 such that the lever body 17 pivots about the bolt 18 with respect to the retainer 13. The dimension of the base of the lever body 17 in the X direction (the thickness of the lever body 17) is substantially equal to the dimension of a hollow space within the retainer 13 in the X direction. Thus, the lever body 17 and the retainer 13 do not move relative to each other in the X direction.

A shift rod 19 projects upward from the lever body 17. A knob 20 is secured to the distal end of the shift rod 19. As shown in FIG. 3, a magnet 21 is secured to a basal end of the lever body 17. When the shift device 10 is assembled, the magnet 21 is located below the lower opening end of the retainer 13.

Figure 2:
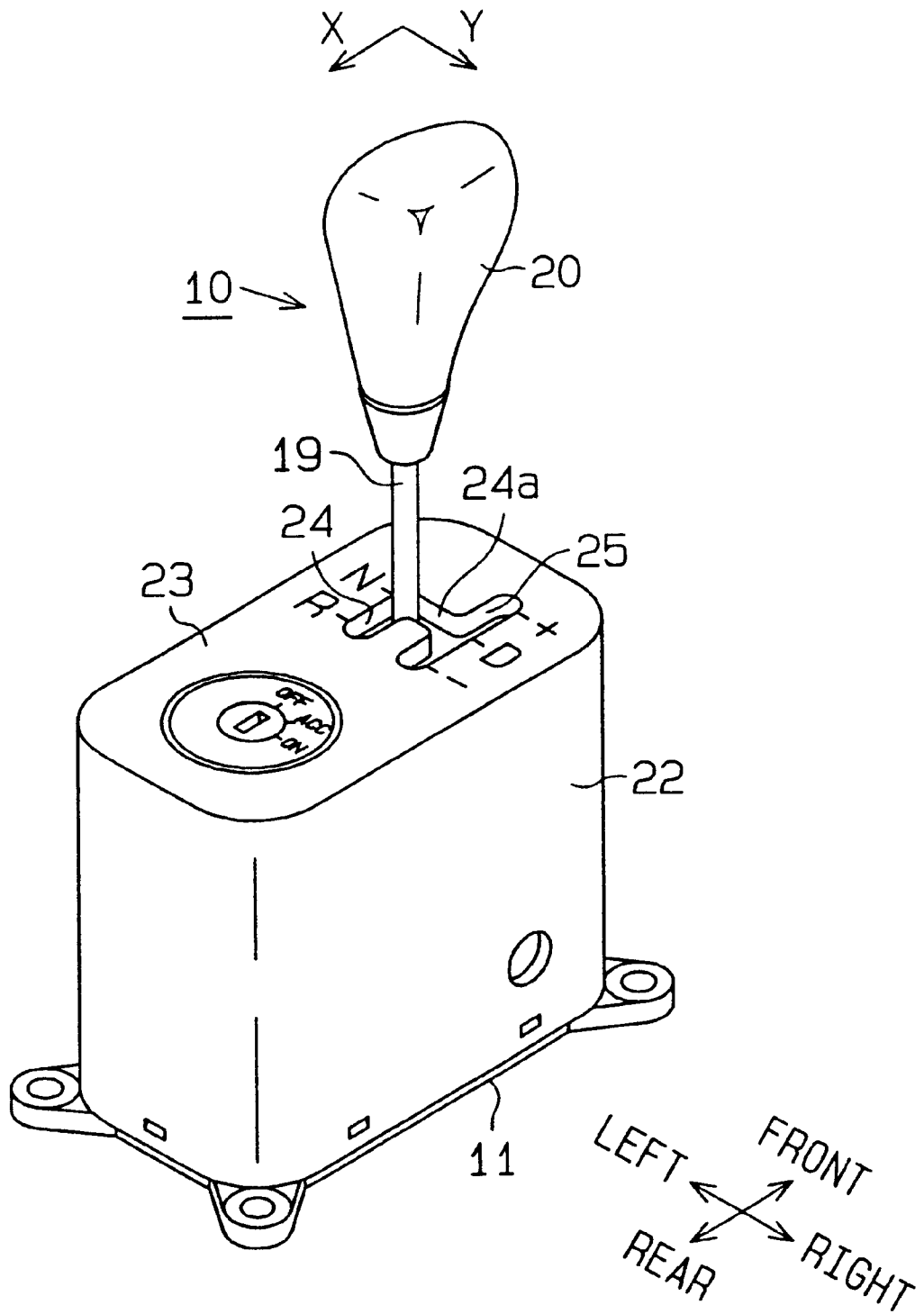
FIG. 2 is a perspective view showing the shift device of FIG. 1 in an assembled state.

As shown in FIG. 2, a cover 22 is attached to the base 11. A pair of slots 24, 25 are formed in an upper plate 23 of the cover 22 and extend in the X direction. A front end of the slot 24 corresponds to the neutral position ("N" position), and the other end of the slot 24 corresponds to the reverse position ("R" position). A front end of the slot 25 corresponds to an accelerating position ("plus (+)" position) and the other end of the slot 25 corresponds to a decelerating position ("minus (-)" position). An intermediate position of the slot 25 corresponds to the drive position ("D" position). A connecting slot 24a connects the portion of the slot 24 corresponding to the "N" position to the portion of the slot 25 corresponding to the "D" position. The shift rod 19 is moved along the slots 24, 25 and is shifted to the "N" position, the "R" position, the "D" position, the "+" position, or the "-" position.

Figure 11:
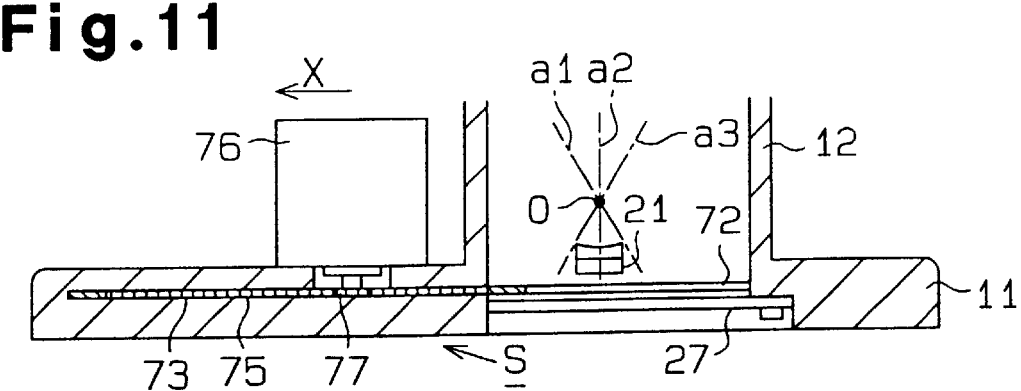
FIG. 11 is a cross-sectional view showing a shielding mechanism.

In FIG. 11, the broken lines a1, a2, and a3 indicate a first position, a second position, and a third position, each of which corresponds to a position of the axis of the lever body 17. More specifically, the lever body 17 is switched selectively among the first position a1 (corresponding to the "-" position and the "R" position), the second, or intermediate, position a2 (corresponding to the "D" position and the "N" position), and the third position a3 (corresponding to the "+" position). The position of the magnet 21 is altered in accordance with the position of the lever body 17.

Figure 12:
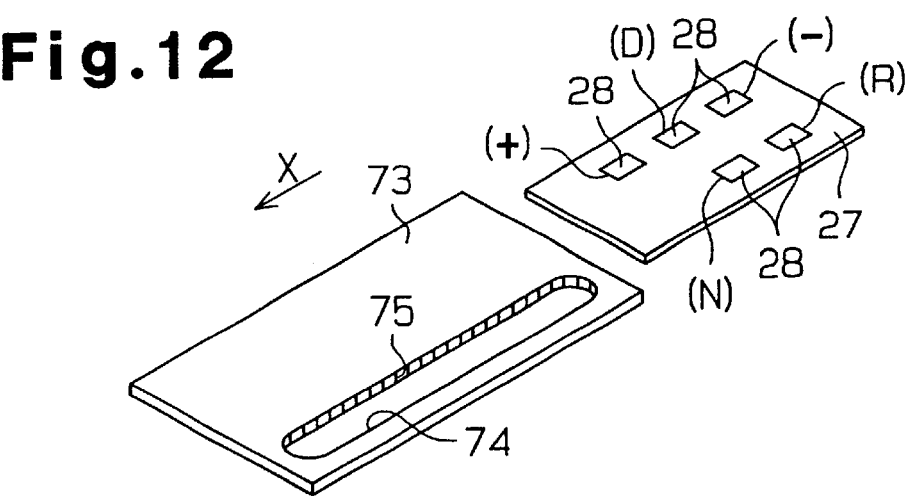
FIG. 12 is a perspective view showing a shutter plate of the shielding mechanism and a magnetic sensor element.

A base plate 27 is secured to the base 11 at a position below the support frame 12. The upper side of the base plate 27 faces the magnet 21. As shown in FIG. 12, a plurality of shift position detecting elements, or magnetic sensor elements 28, are located along the upper side of the base plate 27. It is preferred that the magnetic sensor elements 28 are MRE elements. Each magnetic sensor element 28 is located at a position corresponding to the position of the magnet 21, which is changed depending on whether the shift rod 19 is located at the "N" position, the "R" position, the "D" position, the "+" position, or the "-" position. In this manner, the magnetic sensor element 28 detects that the shift rod 19 is located at the "N" position, the "R" position, the "D" position, the "+" position, or the "-" position. More specifically, when facing the magnet 21, each magnetic sensor element 28 produces a shift position detecting signal, which indicates the position of the lever body 17.

Figure 4:
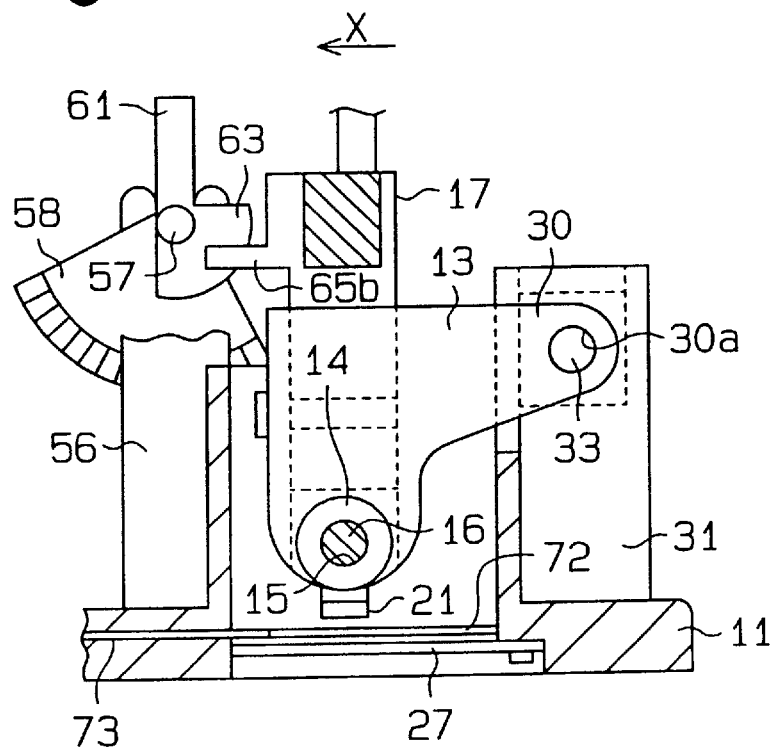
FIG. 4 is a cross-sectional view taken along line 4—4 of FIG. 3.

As shown in FIG. 1, a U-shaped attachment frame 31 is formed integrally with the base 11 at a position adjacent to the support frame 12. A solenoid 32 is accommodated in the space defined by the attachment frame 31. The solenoid 32 includes a plunger 33 and a coil spring 34. As shown in FIG. 4, the retainer 13 includes a tab 30 that extends in the X direction. An engagement hole 30a is formed in the tab 30. When the lever body 17 is located at the "N" position, the tab 30 opposes a rightward outer side of the attachment frame 31. In this state, if the solenoid 32 is inactivated, the coil spring 34 operates to project the plunger 33 from a hole formed in the rightward outer side of the attachment frame 31. The plunger 33 thus engages on the engagement hole 30a of the tab 30, thus preventing the retainer 13 from pivoting.

As shown in FIG. 1, the support frame 12 includes a rightward side 41. A pair of stepped, positioning portions 35, 36 are formed along the top of the rightward side 41. The stepped portion 35, which is to the left of the other stepped portion 36, includes three steps. The stepped portion 36, which is to the right of the stepped portion 35, includes an intermediate recess and a pair of opposing slopes between which the recess is located. The bottom of the intermediate recess of the stepped portion 36 is flush with the intermediate step of the stepped portion 35.

As shown in FIG. 1, the lever body 17 has an extension 37 that extends in the Y direction. As shown in FIG. 3, an accommodation hole 38 is formed in the lower side of the extension 37 and accommodates a positioning pin 39 and a coil spring 40. The positioning pin 39 abuts against either the stepped portion 35 or the stepped portion 36 depending on the position of the lever body 17. The coil spring 40 urges the positioning pin 39 toward the stepped portion 35 or the stepped portion 36. More specifically, when the shift rod 19 is located at the "N" position or the "R" position, the positioning pin 39 abuts against the left stepped portion 35, thus maintaining the shift rod 19 at the corresponding position. In contrast, when the shift rod 19 is located at the "D" position or the "+" position or the "-" position, the positioning pin 39 abuts against the right stepped portion 36, thus maintaining the shift rod 19 at the corresponding position. Since the bottom of the intermediate recess of the stepped portion 36 is flush with the intermediate step of the stepped portion 35, the lever body 17 is permitted to move in the Y direction between the "N" position and the "D" position. The positioning pin 39, the coil spring 40, and the stepped portions 35, 36 form a positioning mechanism.

An ignition key cylinder or a rotary switch 51 will hereafter be described. The key cylinder 51 selectively locks and unlocks the lever body 17.

As shown in FIG. 1, an accommodating sleeve 50 projects from the base 11. The ignition key cylinder 51 is securely fitted in an upper portion of the accommodating sleeve 50. A detection coil 52 is secured to the upper side of the key cylinder 51 and is received in the sleeve 50. A rotor 53 is formed on the upper side of the key cylinder 51. The detection coil 52 encompasses the rotor 53. A key hole 53a is formed in the rotor 53 and is exposed from an opening 22a formed in the cover 22. An ignition key (not shown) matching the key hole 53a is inserted in the key hole 53a.

The rotor 53 includes a known key locking mechanism that includes a plurality of tumblers. When the matching ignition key is inserted in the key hole 53a, the rotor 53 is permitted to rotate clockwise from an "OFF" position to an "ON" position (see FIG. 2). However, if an ignition key that does not match the key hole 53a is inserted in the key hole 53a, the rotor 53 is not permitted to rotate. Regarding the ignition key cylinder 51, the "ON" position is spaced from the "OFF" position by a predetermined angle, which is preferably ninety degrees. Further, the key cylinder 51 includes an "ACCESSORY" position that is located between the "ON" position and the "OFF" position.

The key locking mechanism locks the ignition key when the key is located at positions other than the "OFF" position (that is, the "ACCESSORY" position and the "ON" position). The key is thus inseparable from the key hole 53a. In this specification, the state in which the key is inseparable from the key hole 53a is referred to as the "key locking state", while the state in which the key is separable from the key hole 53a is referred to as the "key unlocking state".

When the rotor 53 is located at the "OFF" position, the key cylinder 51 is locked (hereinafter referred to as the "shift locking state"). If the rotor 53 is rotated from the "OFF" position to the "ON" position using the matching ignition key, the key cylinder 51 is unlocked (hereinafter referred to as the "shift unlocking state").

A plurality of contacts (not shown) are formed in the key cylinder 51. When the rotor 53 is switched from the "OFF" position to the "ACCESSORY" position or the "ON" position, the contacts of the key cylinder 51 are switched correspondingly. Thus, for example, if the rotor 53 is switched to the "ON" position, the engine of the vehicle is started.

A bevel gear 54 is connected to the lower side of the key cylinder 51. A pair of bearing pieces 56 project from the base 11 at a position between the accommodating sleeve 50 and the support frame 12. The bearing pieces 56 pivotally support a locking shaft 57, which extends in the Y direction. A sector gear 58 is secured to the locking shaft 57 and engages with the bevel gear 54.

Figure 10:
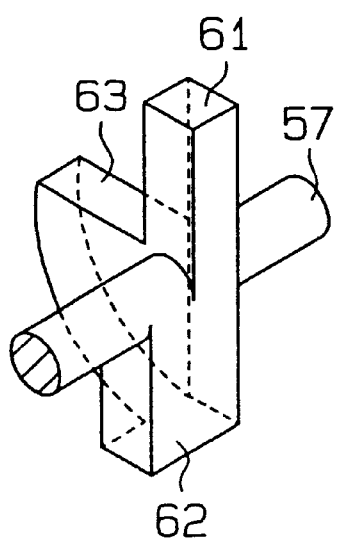
FIG. 10 is a perspective view showing the locking member.

As shown in FIG. 10, a first locking piece 61 and a second locking piece 62 project in opposite radial directions from the substantial axial middle of the locking shaft 57. A dimension of the second locking piece 62 as measured in the Y direction is larger than that of the first locking piece 61 (see FIG. 1). A third locking piece 63 projects from the locking shaft 57. The third locking piece 63 and the first locking piece 61 are located in the same plane. The third locking piece 63 includes a side that extends perpendicular to the adjacent side of the first locking piece 61. The locking shaft 57, the first locking piece 61, the second locking piece 62, and the third locking piece 63 function as a locking member.

Figure 7:
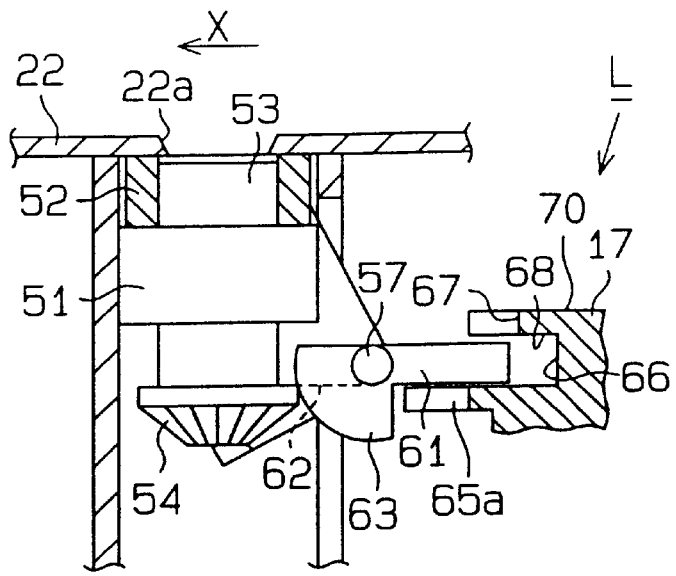
FIG. 7 is a side view showing the locking member of FIG. 5 in a retreating position.

As shown in FIG. 1, the lever body 17 includes a pair of projections 65a, 65b, which project in the X direction. As shown in FIG. 7, the projections 65a, 65b are spaced downward from the locking shaft 57. Thus, if the lever body 17 is moved in X direction, the projections 65a, 65b do not interfere with the locking shaft 57. The upper side of each projection 65a, 65b is flat. A locking groove 69 is formed between the projections 65a, 65b.

Figure 5:
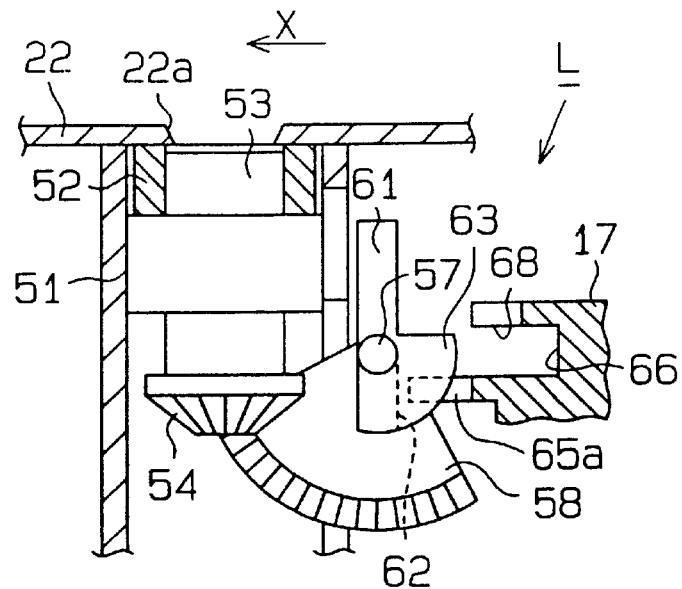
FIG. 5 is a side view showing a locking member located in an operating position.

FIG. 5 shows the locking mechanism when the rotor 53 is located at the "OFF" position. In this state, the first locking piece 61 projects vertically upward from the locking shaft 57. This position of the first locking piece 61 is referred to as a "retreating position" of the first locking piece 61. Further, the third locking piece 63 is located in the locking groove 69 at a position adjacent to the projection 65a. This position of the third locking piece 63 is referred to as a "locking position" of the third locking piece 63.

If the rotor 53 is rotated to the "ON" position using the matching ignition key, the locking mechanism is switched to the state as shown in FIG. 7. More specifically, the locking shaft 57 is rotated by ninety degrees by means of the bevel gear 54 engaged with the sector gear 58. In this state, the first locking piece 61 is horizontal. This position of the first locking piece 61 is referred to as an "operational position" of the first locking piece 61. Further, the third locking piece 63 is removed from the locking groove 69 and is located at an "unlocking position".

Figure 6:
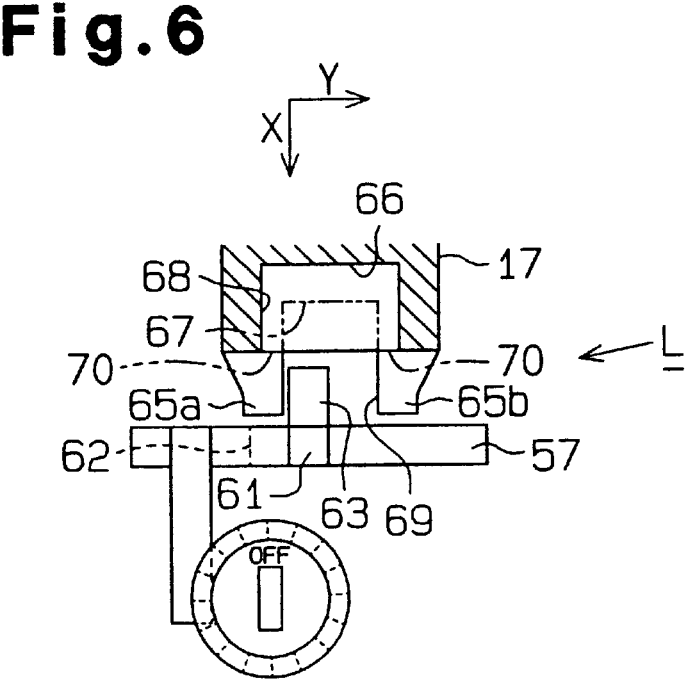
FIG. 6 is a top view showing the locking member of FIG. 5.

The projection 65a, which is located leftward with respect to the third locking piece 63, functions as a locking projection. As shown in FIG. 6, the third locking piece 63 is received in the locking groove 69 when the lever body 17 is located at the "N" position. In this state, abutment between the third locking piece 63 and the projection 65a prevents the lever body 17 from being moved from the "N" position to the "D" position, in the Y direction.

Further, as shown in FIG. 5, if the lever body 17 is located at the "N" position and the first locking piece 61 is pivoted to its retreating position, the second locking piece 62 is located at a position relatively close to the projection 65a (an interfering position). In this state, abutment between the second locking piece 62 and the projection 65a prevents the lever body 17 from being moved from the "N" position to the "R" position, in the X direction.

As shown in FIG. 7, if the lever body 17 is located at the "N" position and the first locking piece 61 is located at the operating position, the second locking piece 62 is located at a retreating position (a non-interfering position). That is, the second locking piece 62 does not interfere with the projection 65a when located at this position. Accordingly, in this state, the lever body 17 is permitted to move from the "N" position to the "R" position, in the X direction.

The lever body 17 includes a recess (receiver) 66 defined by an upper plate 70 and the projections 65a, 65b, as shown in FIG. 7. A notch 67 is formed in the upper plate 70 (see FIG. 1). The notch 67 permits the first locking piece 67 to move from its retreating position to the operating position in the recess 66. The dimension of the notch 67 in the Y direction (the width of the notch 67) and the dimension of the notch 67 in the X direction (the depth of the notch 67) are both shorter than the corresponding dimensions of the recess 66. The upper plate 70 functions as a prohibiting member.

When the first locking piece 61 is located at its operating position (see FIG. 7), the lever body 17 is permitted to move between the "N" position and the "R" position. In other words, the dimension of the recess 66 in the Y direction (the width of the recess 66) is substantially equal to or slightly larger than the movement distance of the lever body 17 from the "N" position to the "D" position. Further, the dimension of the recess 66 in the X direction (the depth of the recess 66) is substantially equal to or slightly larger than the movement distance of the lever body 17 from the "N" position to the "R" position or from the "D" position to the "−" position.

Figure 8A:
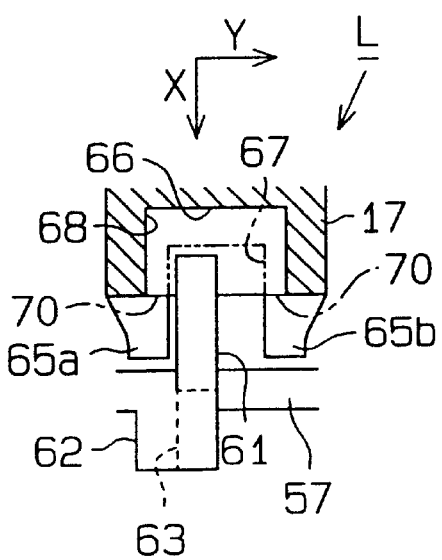
FIG. 8A is a top view showing a stopping mechanism when the shift lever is located at "N" position.
Figure 8B:
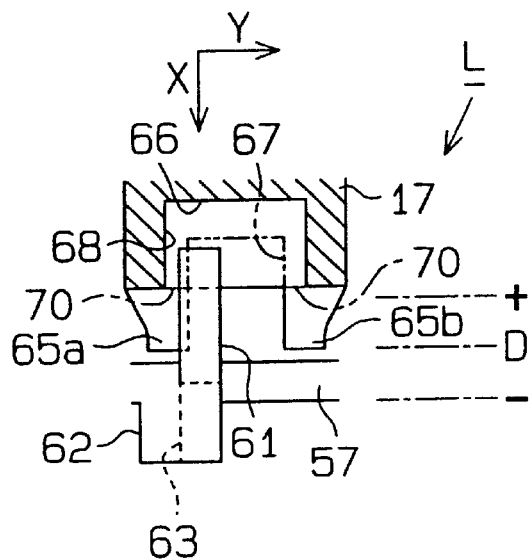
FIG. 8B is a top view showing the stopping mechanism when the shift lever is located at "D" position.

When the lever body 17 is located at the "+" position, the "D" position, or the "−" position, the distal end of each projection 65a, 65b is located at the position indicated by the corresponding reference indices "+", "D", or "−" in FIG. 8B. The drawing shows the state in which the lever body 17 is located at the "D" position. In this state, the first locking piece 61, which is maintained at its operating position, is located at the position interfering with the upper plate 70. Accordingly, abutment between the first locking piece 61 and the upper plate 70 prevents the first locking piece 61 from being moved from its operating position to its retreating position.

When the lever body 17 is located at the "+" position, the "D" (the "N") position, or the "−" (the "R") position, the distal end of the first locking piece 61 is located at the positions indicated by the corresponding reference indices the "+", the "D" (the "N"), or the "−" (the "R").

More specifically, if the lever body 17 is moved from the "D" position to the "+" position, the first locking piece 61, which is located at its operational position, moves relative to the lever body 17 in the X direction. The distal end of the first locking piece 61 is thus located at the position indicated by the index "+". In this state, the first locking piece 61 is located at a position interfering with the upper plate 70.

Further, if the lever body 17 is moved from the "D" position to the "−" position, the first locking piece 61, which is located at its operational position, moves relative to the lever body 17 in an opposite direction to the X direction. The distal end of the first locking piece 61 is thus located at the position indicated by the index "−". In this state, the first locking piece 61 is located at a position interfering with the upper plate 70.

FIG. 8A shows the state in which the lever body 17 is located at the "N" position. If the lever body 17 is moved from the "N" position to the "R" position, the first locking piece 61, which is located at its operational position, moves relative to the lever body 17 in the opposite direction to the X direction. In this state, the distal end of the first locking piece 61 is located at a position interfering with the upper plate 70.

As described, when the lever body 17 is moved from the "D" position to the "+" position or from the "D" position to the "−" position or from the "N" position to the "R" position, the first locking piece 61 is maintained at a position interfering with the upper plate 70. In this state, abutment between the first locking piece 61 and the upper plate 70 prevents the first locking piece 61 from retreating from its operating position to its retreating position.

Figure 9:
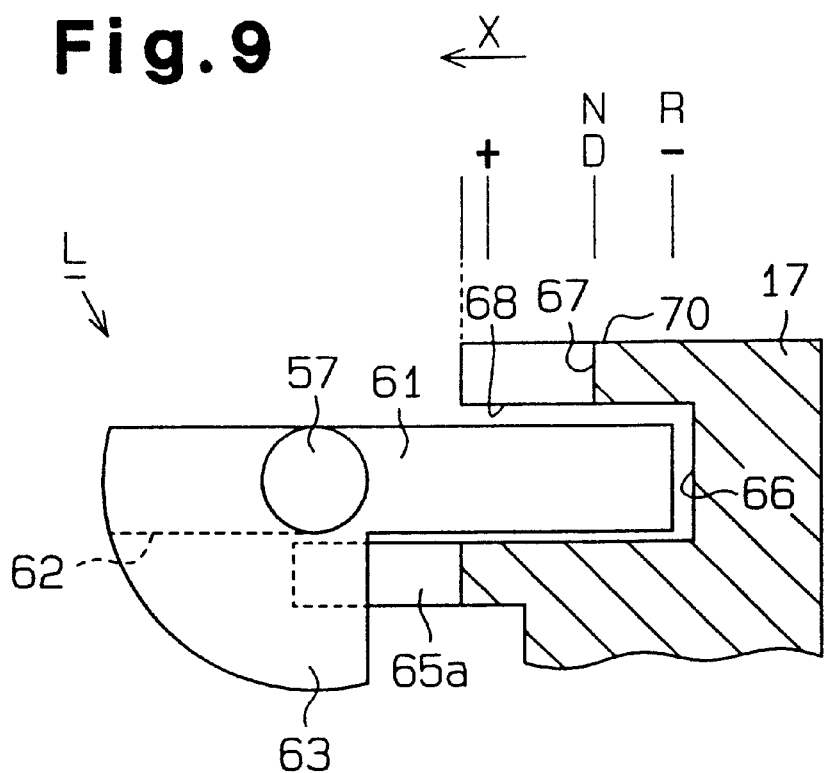
FIG. 9 is a side view showing the locking member located in the operating position.

As shown in FIG. 9, if the lever body 17 is moved from the "N" position to the "R" position, the projection 65a is maintained at a position interfering with the locking shaft 57 and the second locking piece 62. In this state, the projection 65a is located adjacent to the base of the second locking piece 62. The projection 65a thus prevents the second locking piece 62 from rotating counterclockwise as viewed in FIG. 9. That is, if the lever body 17 is located at the "R" position, the first locking piece 61 and the second locking piece 62 prevent the locking shaft 57 from rotating.

As described, the first locking piece 61, the second locking piece 62, the third locking piece 63, the projection 65a, the recess 66, and the upper plate 70 form a stopping mechanism L.

Next, a shielding mechanism S of the base plate 27 will be described with reference to FIGS. 3, 11, and 12.

FIG. 11 is a cross-sectional view showing the shielding mechanism S. A pair of guide grooves 72 extend in the base 11 in the X direction. The interval between the guide grooves 72 is greater than the dimension of the base plate 27 in the Y direction. A shutter plate 73, as shown in FIG. 12, is engaged with the guide grooves 72 and slides along the guide grooves 72. The shutter plate 73 is thus moved between a shielding position and a non-shielding position, which is shown in FIG. 11. When located at the non-shielding position, the shutter plate 73 does not shield the magnetic sensor elements 28 of the base plate 27. The shutter plate 73 has an elongated opening 74 that extends in the X direction. A rack 75 is formed in a side wall of the elongated opening 74. A motor 76 is secured to the upper side of the base 11. A pinion 77 is attached to the output shaft of the motor 76. The pinion 77 is engaged with the rack 75 of the shutter plate 73. The motor 76 is driven to move the shutter plate 73 between the shielding position and the non-shielding position.

An electric circuit of the shift device 10 will hereafter be described.

An ignition key (not shown) that corresponds to the key cylinder 51 is provided independently from the shift device 10. A known transponder is incorporated in the ignition key. The transponder memorizes an identification code for a car-theft preventing device, which is an immobilizer. When the key is inserted in the key hole 53a of the key cylinder 51, the transponder is moved to a position adjacent to the detecting coil 52. The transponder thus supplies the identification code to an electronic control unit for the immobilizer, or the immobilizer ECU 78, through the detecting coil 52.

Figure 13:
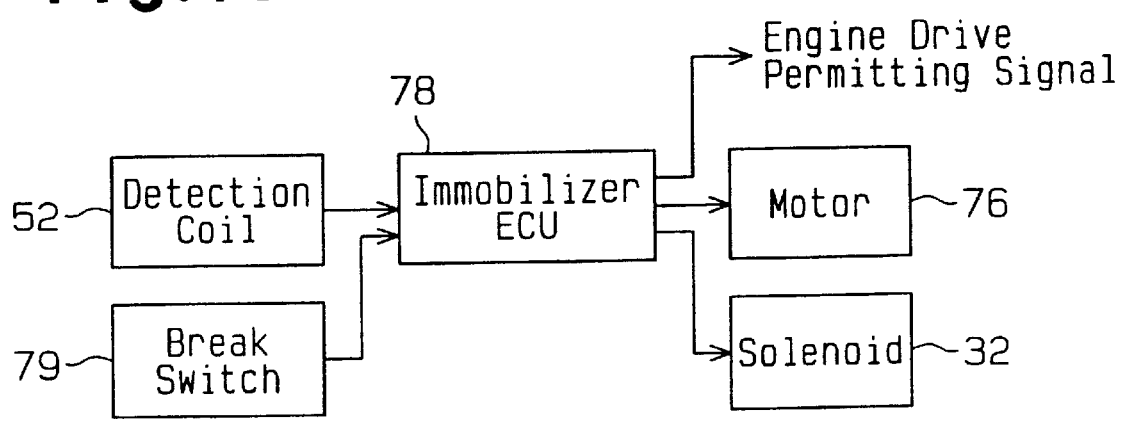
FIG. 13 is a block diagram schematically showing an electric circuit of the shift device of FIG. 1.

As shown in FIG. 13, the immobilizer ECU 78 judges whether or not the supplied identification code corresponds to an identification code stored in the immobilizer ECU 78. If the judgment is positive, the immobilizer ECU 78 sends a signal for continuously driving the engine to an ECU for the engine, or an engine ECU (not shown). However, if the judgment is negative, or the supplied identification code does not correspond to the stored identification code, the immobilizer ECU 78 sends a signal for stopping the engine to the engine ECU.

Further, if the identification code supplied from the key corresponds to the identification code stored in the immobilization ECU 78, the immobilizer ECU 78 actuates the motor 76 to move the shutter plate 73 from the shielding position to the non-shielding position. In contrast, if the identification code of the ignition key does not correspond to the stored identification code, the immobilizer ECU 78 maintains the shutter plate 73 at the shielding position.

A brake switch 79 is located in the vicinity of a brake pedal and sends a control signal to the immobilizer ECU 78 when the brake pedal is depressed. If the brake switch 79 is turned on, the immobilizer ECU 78 excites the solenoid 32. In this state, the plunger 33 of the solenoid 32 is retracted against the force of the coil spring 34. Accordingly, the plunger 33 is disengaged from the engagement hole 30*a* of the retainer 13, thus unlocking the retainer 13. In contrast, if the brake switch 79 is turned off, the immobilizer ECU 78 de-excites the solenoid 32. In this state, the coil spring 34 operates to engage the plunger 33 with the engagement hole 30*a* of the retainer 13, thus locking the retainer 13.

The operation of the shift device 10 will now be described.

1. When the lever body 17 is located at the "N" position

Hereinafter, an "initial state" is defined as the state of the shift device 10 when the lever body 17 is located at the "EN" position and the rotor 53 is located at the "OFF" position. In the initial state, the first locking piece 61 is located in the retreating position (see FIGS. 5 and 6), and the plunger 33 is engaged with the engagement hole 30*a* of the retainer 13, thus locking the retainer 13.

First, when the brake pedal is depressed, the immobilizer ECU 78 excites the solenoid 32 in accordance with a control signal from the brake switch 79, thus unlocking the retainer 13. In this state, the second locking piece 62 is located at its interfering position while the third locking piece 63 is located at its locking position, as shown in FIGS. 5 and 6. Accordingly, the lever body 17 is stopped from being moved from the "N" position to the "R" position in the X direction and from the "N" position to the "D" position in the Y direction. Further, since the rotor 53 is maintained at the "OFF" position, the second locking piece 62 and the third locking piece 63 maintain the key cylinder 51 as locked, or in the shift locking state.

If a matching ignition key is inserted in the key hole 53*a*, the rotor 53 is permitted to operate. That is, the key cylinder 51 is rotated clockwise from the "OFF" position to the "ON" position by a predetermined angle (which is preferably ninety degrees) using the ignition key. The rotation of the ignition key is transmitted to the locking mechanism through the bevel gear 54, the sector gear 58, and the locking shaft 57. More specifically, the first locking piece 61 is moved from the retreating position shown in FIGS. 5 and 6 to the operating position shown in FIGS. 7 and 8A. Further, the second locking piece 62 is moved from the interfering position to the non-interfering position, and the third locking piece 63 is moved from the locking position to the unlocking position.

In this state, the solenoid 32 is excited to unlock the retainer 13. The retainer 13 is thus permitted to rotate, and the lever body 17 is permitted to move in the X direction while the lever body 17 is permitted to rotate around the support bolt 18 in the Y direction. In other words, if the rotor 53 is switched from the "OFF" position to the "ON" position using the matching ignition key, the second locking piece 62 and the third locking piece 63 are operated to unlock the shift device 10, or hold the shift device 10 in the shift unlocking state.

In response to the rotation of the rotor 53 to the "ON" position, a switch (not shown) provided in the key cylinder 51 generates an engine starting signal. The immobilizer ECU 78 then judges whether or not the identification code, which is supplied from the transponder of the ignition key, corresponds to the stored identification code. If the judgment is positive, the immobilizer ECU 78 sends a signal for continuously driving the engine to the engine ECU. Further, the immobilizer ECU 78 actuates the motor 76 to move the shutter plate 73 from the shielding position to the non-shielding position.

2. When the lever body 17 is located at the "D" position

Next, the lever body 17 is shifted from the "N" position to the "D" position by means of the knob 20. Accordingly, the first locking piece 61 is located at the position interfering with the upper plate 70, as shown in FIG. 8A.

3. When the lever body 17 is located at the "+" position

If the lever body 17 is shifted from the "D" position to the "+" position, the first locking piece 61 moves relative to the lever body 17 in the X direction. When the lever body 17 is located at the "+" position, the first locking piece 61 is located at the position interfering with the upper plate 70, and the distal end of the first locking piece 61 is located at the position indicated by the reference index "+" in FIG. 9.

4. When the lever body 17 is located at the "−" position

If the lever body 17 is shifted from the "D" position to the "−" position, the first locking piece 61 moves relative to the lever body 17 in an opposite direction to the X direction. When the lever body 17 is located at the "−" position, the first locking piece 61 is located at the position interfering with the upper plate 70, and the distal end of the first locking piece 61 is located at the position indicated by the reference index "−" in FIG. 9.

5. When the lever body 17 is located at the "R" position

If the lever body 17 is shifted from the "N" position (FIG. 8A) to the "R" position, the first locking piece 61 moves relative to the lever body 17 in an opposite direction to the X direction. When the lever body 17 is located at the "R" position, the first locking piece 61 is located at the position interfering with the upper plate 70 (as indicated by the reference index the "R" in FIG. 9).

As described, if the lever body 17 is moved from the "D" position to the "+" position or from the "D" position to the "−" position or from the "N" position to the "R" position, the first locking piece 61 is maintained at the position interfering with the upper plate 70. In this state, abutment between the first locking piece 61 and the upper plate 70 prevents the first locking piece 61 from retreating from its operating position to its retreating position. In other words, if the lever body 17 is located at the positions other than the "N" position, the rotor 53 cannot be rotated from the "ON" position to the "OFF" position even with the matching ignition key.

While the lever body 17 is being moved from the "N" position (FIG. 8A) to the "R" position, the projection 65*a* remains at the position interfering with the locking shaft 57. Further, when the lever body 17 is located at the "R" position, the projection 65*a* is located relatively close to the base of the second locking piece 62. In this state, abutment between the base of the second locking piece 62 and the projection 65*a* prevents the second locking piece 62 from rotating counterclockwise, as viewed in FIG. 9. In other words, the first locking piece 61 and the second locking piece 62 prevent the locking shaft 57 from rotating as long as the lever body 17 is located at the "R" position. The rotor 53 is thus prevented from being shifted from the "ON" position to the "OFF" position even with the matching ignition key.

The illustrated embodiment has the following advantages.

(1) The shift device 10 has the key cylinder 51 and the stopping mechanism L. The key cylinder 51 is shifted between the key locking state and the key unlocking state. The stopping mechanism L selectively prevents the lever body 17 from being moved from a certain position in the X direction or the Y direction depending on whether the key cylinder 51 is maintained in the key locking state or the key unlocking state. If the rotor 53 is rotated to the "OFF" position to hold the key cylinder 51 in the key unlocking state, the stopping mechanism L prevents the lever body 17 from being moved from the "N" position to the "R" position in the X direction or from the "N" position to the "D" position in the Y direction.

If the rotor 53 is rotated from the "OFF" position to the "ON" position using the matching ignition key, the key cylinder 51 is switched to the key locking state. In this state, the stopping mechanism L permits the lever body 17 to move from the "N" position to a certain position in the X direction or the Y direction.

In contrast, if the rotor 53 is rotated from the "ON" position to the "OFF" position using the matching ignition key, the key cylinder 51 is switched from the key locking state to the key unlocking state. In this state, the stopping mechanism L prevents the lever body 17 from being moved in the X direction or the Y direction.

(2) The magnetic sensor elements 28, which are located below the lever body 17, detect the position at which the lever body 17 is located. A shift position signal corresponding to the detected position is generated. The signal is sent to, for example, the engine ECU. The engine ECU performs a control procedure in accordance with the vehicle's operational state based on the shift position signal.

(3) As shown in FIGS. 5 and 6, when the key cylinder 51 is located at the OFF position, the second locking piece 62 and the third locking piece 63 are located at shift-lock position. More specifically, the second locking piece 62 abuts against the distal end surface of the projection 65*a* and the third locking piece 63 abuts against the right surface of the projection 65*a*. This prevents the shift lever from being moved in the X direction and the Y direction. On the other hand, as shown in FIGS. 7, 8A and 8B, when the key cylinder 51 is located at the ON position, the second locking piece 62 and the third locking piece 63 are located at shift-unlock position. More specifically, the second locking piece 62 is located at the non-interfering position and the third locking piece 63 is out of the notch 67. Accordingly, the abutment between the second locking piece 62 and the distal end surface of the projection 65*a* and the abutment between the third locking piece 63 and the right surface of the projection 65*a* are avoided for permitting the shift lever 17 to move in the X direction and the Y direction. The stopping mechanism L mechanically stops the movement of the lever body 17, thus reducing the cost. Further, the stopping mechanism L is located between the lever body 17 and the key cylinder 51, thus the stopping mechanism L directly and reliably locks the lever body 17.

(4) The locking member including the second locking piece 62 and the third locking piece 63 is connected to the key cylinder 51 through the gear mechanism that includes the bevel gear 54 and the sector gear 58. Thus, when the key cylinder 51 is shifted to the key locking state or the key unlocking state, the gear mechanism reliably changes the position of the second locking piece 62 and that of the third locking piece 63.

(5) The locking shaft 57, the first locking piece 61, the second locking piece 62, and the third locking piece 63 are formed as one body. This structure reduces the number of the parts that form the stopping mechanism L.

(6) If the lever body 17 is permitted to move in both directions, or the X direction and the Y direction, the upper plate 70 prevents the stopping mechanism L from being moved to a stopping position. The stopping position of the stopping mechanism L corresponds to the interfering position of the second locking piece 62 and the locking position of the third locking piece 63.

Accordingly, when the lever body 17 is permitted to move from the "N" position in the X direction and the Y direction, the key cylinder 51 is not permitted to rotate from the "ON" position to the "OFF" position. Further, in this state, the key cylinder 51 is maintained in the key locking state. The ignition key is thus inseparable from the rotor 53.

The illustrated embodiment may be modified as follows.

The shift positions may be a combination of those selected from the group consisting of the "P" position, the "N" position, the "R" position, the "D" position, "3" position, "2" position, and "1" position.

The key cylinder 51 may include a "START" position. In this case, the engine starter is actuated when the key cylinder 51 is shifted from the "OFF" position to the "START" position via the "ON" position using the matching ignition key. A return spring then returns the ignition key from the "START" position to the "ON" position. Further, the number of the teeth of the sector gear 58 must be increased in accordance with the number of the positions of the key cylinder 51. In addition, the shape of the recess 66 must be altered not to interfere with the first locking piece 61.

Although the shift position is detected magnetically in the illustrated embodiment, the shift position may be detected using a prior art wire.

Figure 14:
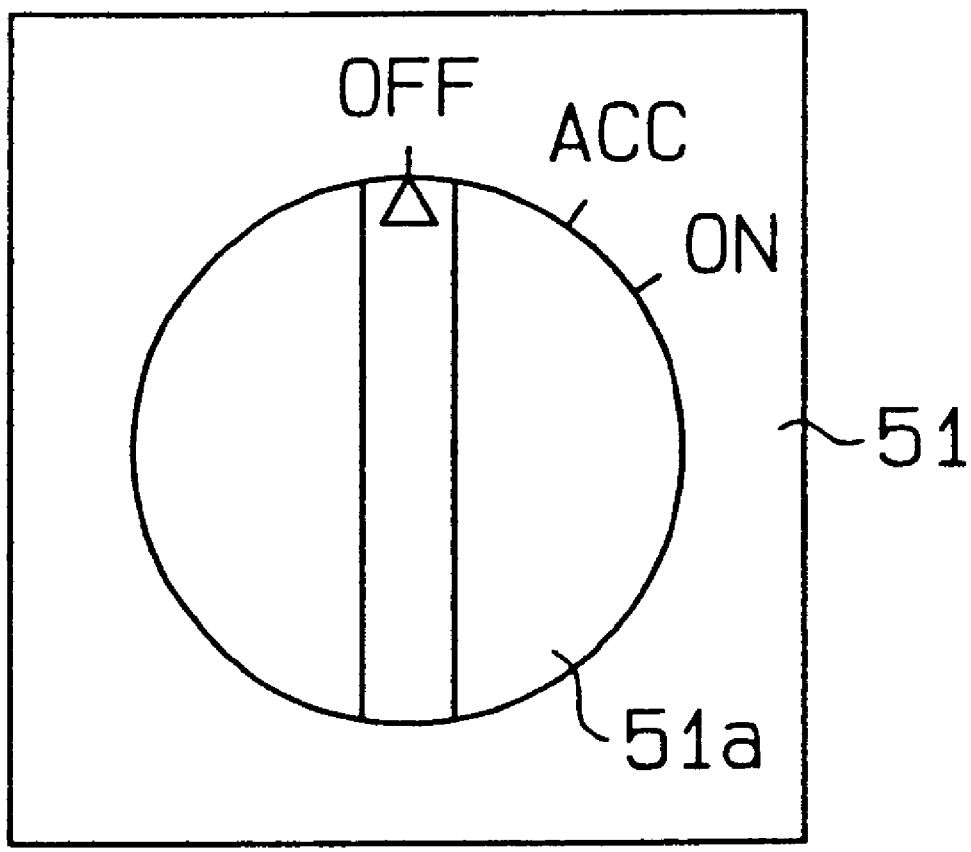
FIG. 14 is a front view of a manually rotary switch having a knob.

As shown in FIG. 14, a rotary switch 51 having a manually operable knob 51*a* may replace the key cylinder 51. In this case, a key is not inserted in the rotary switch 51 and the knob 51*a* is manually operated by the driver without using a key. The rotary switch 51 is located adjacent to the shift lever body 17. The position of the knob 51*a* is manually selected at the "OFF" position, the "ACC" position, or the "ON" position. When the knob 51*a* is switched to the "ON" position, the movement of the shift lever body 17 in the X direction and the Y direction is permitted and an engine driving signal is generated. On the other hand, when the knob 51*a* is switched to the "OFF" position, the movement of the shift lever body 17 in the X direction and the Y direction is restricted.

The location of the bevel gear 54 and that of the sector gear 58 may be switched.

The second locking piece 62 may be omitted. Instead, a projection may project in the locking groove 69 to a position close to the third locking piece 63. In this case, abutment between the third locking piece 63 and the projection prevents the lever body 17 from being moved from the "N" position to the "R" position.

The location of the slot 24 and that of the slot 25 may be switched. In this case, the locations of the magnetic sensor elements 28, the positions at which the first locking piece 61 interferes with the upper plate 70, and the position of the projection 65*b* relative to the second locking piece 62 must be changed correspondingly.

The shape of the upper plate 70 may be modified as long as the upper plate 70 is capable of interfering with the first locking piece 61.

The stopping mechanism L may include a locking member that moves linearly to switch between the shift locking state and the shift unlocking state, instead of the rotational locking member.

The present invention may be applied to shift devices other than those used in the shift-by-wire type automatic transmission mechanism.

Therefore, the present examples and embodiments are to be considered as illustrative and not restrictive and the invention is not to be limited to the details given herein, but may be modified within the scope and equivalence of the appended claims.

What is claimed is:

1. A shift device comprising:
    a shift lever, which is manually operated in a first direction and a second direction, wherein the first and the second directions are crossed at a cross-position;
    a rotary switch, which is located adjacent to the shift lever and is switched between a plurality of rotational positions, wherein the rotary switch generates an engine driving signal depending on a selected rotational position; and a stopping mechanism, which is located between the rotary switch and the shift lever for stopping the movement of the shift lever in the first and the second directions when the shift lever is located at the cross position, depending on the selected rotational position.

2. The shift device as set forth in claim 1, wherein the rotary switch is a key cylinder that receives a key corresponding to the key cylinder, the key is located at a key position selected from a plurality of key positions, and the key cylinder generates an engine driving signal depending on the selected key position.

3. The shift device as set forth in claim 2, wherein the key cylinder includes a key lock mechanism for selectively preventing the key from being separated from the key cylinder depending on the selected key position, the key lock mechanism having a key locking position and a key unlocking position, and wherein the stopping mechanism selectively restricts movement of the shift lever depending on the position of the key lock mechanism.

4. The shift device as set forth in claim 1, wherein the rotary switch has a knob and is manually operated by an operator without using a key.

5. The shift device as set forth in claim 1, wherein the stopping mechanism restricts switching operation of the rotary switch when the shift lever is not located at a specific position.

6. The shift device as set forth in claim 5, wherein the stopping mechanism permits switching operations of the rotary switch when the shift lever is located at the specific position.

7. A shift device connected to a vehicle transmission device, comprising:

a base;

a shift lever, which is supported by the base to pivot selectively in a first direction and a second direction;

a key cylinder, which is located on the base at a position adjacent to the shift lever and is rotated to a plurality of key positions including an ON position and an OFF position using a key corresponding to the key cylinder; and a stopping mechanism, which is located between the key cylinder and the shift lever for stopping the movement of the shift lever in the first and second directions when the key cylinder is located at the OFF position but permitting the movement of the shift lever in the first and second directions when the key cylinder is located at the ON position, wherein the stopping mechanism includes:

a locking member, which is supported by the base and which includes a locking shaft and a first locking piece that projects radially from the locking shaft;

a gear, which is attached to the key cylinder for transmitting the rotation of the key cylinder to the locking member, wherein the gear rotates the first locking piece between a horizontal position and a vertical position around the locking shaft, and the first locking piece is located at the vertical position when the key cylinder is held at the OFF position and is moved to the horizontal position when the key cylinder is rotated to the ON position; and a receiver, which is formed in the shift lever and is capable of receiving the first locking piece when the first locking piece is located at the horizontal position.

8. The shift device as set forth in claim 7, wherein:

the locking member further has a second locking piece and a third locking piece, wherein the second locking piece extends from the locking shaft in a direction that is opposite to a projecting direction of the first locking piece, and the third locking piece extends from the locking shaft and is transverse to the locking shaft, the third locking piece having a side that is perpendicular to an adjacent side of the first locking piece, wherein the second locking piece abuts against a portion of the receiver to prevent the shift lever from being moved in the first direction while the third locking piece abuts against another portion of the receiver to prevent the shift lever from being moved in the second direction, when the key cylinder is located at the OFF position.

9. The shift device as set forth in claim 8, wherein the abutment between the second locking piece and the corresponding portion of the receiver and the abutment between the third locking piece and the corresponding portion of the receiver are avoided for permitting the shift lever to move in the first and second directions when the key cylinder is located at the ON position.

10. A shift device connect to a vehicle transmission device, comprising:

a base;

a shift lever, which is supported by the base to pivot selectively in a first direction and a second direction;

a rotary switch having a knob, which is located on the base at a position adjacent to the shift lever and is rotated to a plurality of rotational positions including an ON position and an OFF position without using a key; and a stopping mechanism, which is located between the rotary switch and the shift lever for stopping the movement of the shift lever in the first and second directions when the rotary switch is located at the OFF position but permitting the movement of the shift lever in the first and second directions when the rotary switch is located at the ON position, wherein the stopping mechanism includes:

a locking member, which is supported by the base and which includes a locking shaft and a first locking piece that projects radially from the locking shaft;

a gear, which is attached to the rotary switch for transmitting the rotation of the rotary switch to the locking member, wherein the gear rotates the first locking piece between a horizontal position and a vertical position around the locking shaft, and the first locking piece is located at the vertical position when the key cylinder is held at the OFF position and is moved to the horizontal position when the rotary switch is rotated to the ON position; and a receiver, which is formed in the shift lever and is capable of receiving the first locking piece when the first locking piece is located at the horizontal position.

11. The shift device as set forth in claim 10, wherein:

the locking member further has a second locking piece and a third locking piece, wherein the second locking piece extends from the locking shaft in a direction that is opposite to a projecting direction of the first locking piece, and the third locking piece extends from the locking shaft and is transverse to the locking shaft, the third locking piece having a side that is perpendicular to an adjacent side of the first locking piece, wherein the second locking piece abuts against a portion of the receiver to prevent the shift lever from being moved in the first direction while the third locking piece abuts against another portion of the receiver to prevent the shift lever from being moved in the second direction, when the rotary switch is located at the OFF position.

12. The shift device as set forth in claim 11, wherein the abutment between the second locking piece and the corresponding portion of the receiver and the abutment between the third locking piece and the corresponding portion of the receiver are avoided for permitting the shift lever to move in the first and second directions when the rotary switch is located at the ON position.

13. A shift device connected to a vehicle transmission device, comprising:

a base;

a shift lever, which is supported by the base to pivot selectively in a first direction and a second direction, wherein the first direction is substantially perpendicular to the second direction;

a key cylinder, which is located on the base at a position adjacent to the shift lever and is rotated to a plurality of key positions including an ON position and an OFF position using a key corresponding to the key cylinder, wherein the key cylinder generates an engine driving signal when the key cylinder is located at the ON position by using the key corresponding to the key cylinder; and a stopping mechanism, which is located between the key cylinder and the shift lever for stopping the movement of the shift lever in the first and second directions when the key cylinder is located at the OFF position but permitting the movement of the shift lever in the first and second directions when the key cylinder is located at the ON position, wherein the stopping mechanism includes:

a locking member, which is pivotally supported by the base, wherein the locking member has a locking shaft, a first locking piece, a second locking piece, and a third locking piece, wherein the first locking piece projects perpendicularly from the locking shaft, the second locking piece projects from the locking shaft in a direction that is opposite to a projecting direction of the first locking piece, and the third locking piece extends from the locking shaft and is transverse to the locking shaft, the third locking piece has a side that is perpendicular to an adjacent side of the first locking piece, and wherein each of the first, second and third locking pieces is rotated between a horizontal position and a vertical position about the locking shaft;

a receiver having a recess that is formed in the shift lever and is capable of receiving the first locking piece located at the horizontal position; and a gear, which is attached to the key cylinder for transmitting the rotation of the key cylinder to the locking member, wherein when the key cylinder is rotated to the OFF position, the gear rotates the first and second locking pieces to their vertical positions and rotates the third locking piece to its horizontal position, and when the key cylinder is rotated to the ON position, the gear rotates the first and second locking pieces to their horizontal positions and rotates the third locking piece to its vertical position.

14. The shift device as set forth in claim 13, wherein the receiver includes a locking projection having a distal end surface and a side surface, and wherein the second locking piece abuts against the distal end surface of the locking projection to prevent the shift lever from being moved in the first direction while the third locking piece abuts against the side surface of the locking projection to prevent the shift lever from being moved in the second direction, when the key cylinder is located at the OFF position.

15. The shift device as set forth in claim 13, wherein the abutment between the second locking piece and the distal end surface of the locking projection and the abutment between the third locking piece and the side surface of the locking projection are avoided to permit the shift lever to move in the first and second directions when the key cylinder is located at the ON position.

* * * * *